United States Patent
Mitsuishi

(10) Patent No.: US 10,108,469 B2
(45) Date of Patent: Oct. 23, 2018

(54) MICROCOMPUTER AND MICROCOMPUTER SYSTEM

(71) Applicant: Renesas Electronics Corporation, Kawasaki-shi (JP)

(72) Inventor: Naoki Mitsuishi, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 213 days.

(21) Appl. No.: 14/803,051

(22) Filed: Jul. 18, 2015

(65) Prior Publication Data

US 2016/0041860 A1 Feb. 11, 2016

(30) Foreign Application Priority Data

Aug. 5, 2014 (JP) .................................. 2014-159261

(51) Int. Cl.
*G06F 11/07* (2006.01)
*G06F 11/08* (2006.01)

(52) U.S. Cl.
CPC ........ *G06F 11/0721* (2013.01); *G06F 11/073* (2013.01); *G06F 11/0757* (2013.01); *G06F 11/0772* (2013.01); *G06F 11/08* (2013.01)

(58) Field of Classification Search
CPC ....... G06Q 10/06375; G06Q 10/06312; G06Q 10/06395; G06Q 10/10; G06Q 30/0201; G06Q 30/0282; G06F 15/18
See application file for complete search history.

(56) References Cited

U.S. PATENT DOCUMENTS

| 5,276,823 | A | * | 1/1994 | Cutts, Jr. | G06F 9/3824 714/10 |
| 5,568,437 | A | * | 10/1996 | Jamal | G11C 29/44 365/189.07 |
| 5,617,531 | A | * | 4/1997 | Crouch | G11C 29/006 714/10 |
| 5,933,344 | A | | 8/1999 | Mitsuishi et al. | |

(Continued)

FOREIGN PATENT DOCUMENTS

JP H08-263104 A 10/1996
JP 2001-027954 A 1/2001

(Continued)

*Primary Examiner* — Bryce P Bonzo
*Assistant Examiner* — Jeison C Arcos
(74) *Attorney, Agent, or Firm* — McGinn IP Law Group, PLLC

(57) ABSTRACT

A microcomputer includes a plurality of functional blocks that exchange information with each other. A nonvolatile memory can rewrite information stored therein and first data has been written therein in advance. A central processing unit processes information read from the nonvolatile memory or writes information to the nonvolatile memory. An abnormality detecting unit detects an abnormality in exchange of data between the plurality of functional blocks. A nonvolatile memory checking unit reads the first data from the nonvolatile memory when the abnormality detecting unit has detected an abnormality, compares the first data with second data indicating the content of the first data when written to the nonvolatile memory, and detects an abnormality in the nonvolatile memory when a result of the comparison shows that the first data is not identical to the second data.

20 Claims, 14 Drawing Sheets

(56) References Cited

U.S. PATENT DOCUMENTS

| | | | | |
|---|---|---|---|---|
| 6,070,255 | A * | 5/2000 | Dell | G06F 11/2284 714/48 |
| 6,654,648 | B2 * | 11/2003 | Nada | B60K 6/365 700/19 |
| 8,271,700 | B1 * | 9/2012 | Annem | G06F 13/28 710/22 |
| 8,626,820 | B1 * | 1/2014 | Levy | G06F 11/1004 709/201 |
| 8,924,786 | B2 * | 12/2014 | Menon | G11C 29/022 714/25 |
| 8,996,939 | B2 * | 3/2015 | Casarsa | G01R 31/31701 714/726 |
| 9,202,516 | B1 * | 12/2015 | Eldin | G11B 5/00817 |
| 9,372,870 | B1 * | 6/2016 | Levy | G06F 17/30206 |
| 9,432,298 | B1 * | 8/2016 | Smith | H04L 49/9057 |
| 2001/0013110 | A1 * | 8/2001 | Pierce | G11C 29/14 714/718 |
| 2002/0091979 | A1 * | 7/2002 | Cooke | G01R 31/318342 714/733 |
| 2002/0166078 | A1 * | 11/2002 | Oldfield | G06F 3/0626 714/6.12 |
| 2004/0042292 | A1 | 3/2004 | Sakata et al. | |
| 2004/0143695 | A1 * | 7/2004 | Hashimoto | F02D 41/2496 711/1 |
| 2006/0156075 | A1 * | 7/2006 | Mitsuishi | G06F 11/0721 714/51 |
| 2007/0165454 | A1 * | 7/2007 | Saito | G11C 16/0416 365/185.01 |
| 2007/0226597 | A1 * | 9/2007 | Taito | G06F 11/1068 714/785 |
| 2007/0279997 | A1 * | 12/2007 | Yoshioka | G11C 29/12 365/185.22 |
| 2007/0294496 | A1 * | 12/2007 | Goss | G06F 12/1408 711/163 |
| 2008/0089139 | A1 * | 4/2008 | Ong | G11C 7/10 365/189.08 |
| 2008/0256407 | A1 * | 10/2008 | Selva | G01R 31/3187 714/732 |
| 2009/0006900 | A1 * | 1/2009 | Lastras-Montano | G06F 11/1044 714/42 |
| 2009/0199056 | A1 * | 8/2009 | Murata | G06F 11/1008 714/704 |
| 2010/0290288 | A1 * | 11/2010 | Kang | G11C 29/4401 365/185.18 |
| 2011/0258499 | A1 * | 10/2011 | Casarsa | G01R 31/31701 714/726 |
| 2011/0299317 | A1 * | 12/2011 | Shaeffer | G11C 13/0002 365/106 |
| 2012/0066551 | A1 * | 3/2012 | Palus | G06F 11/3636 714/39 |
| 2013/0332781 | A1 * | 12/2013 | Jayakumar | G06F 11/0751 714/49 |
| 2014/0078850 | A1 * | 3/2014 | Eguchi | G11O 5/14 365/227 |
| 2014/0223031 | A1 * | 8/2014 | Alarcon | G05F 1/625 710/5 |
| 2014/0365813 | A1 * | 12/2014 | Sim | G06F 1/24 714/5.1 |
| 2015/0089310 | A1 * | 3/2015 | Motwani | G06F 11/076 714/704 |

FOREIGN PATENT DOCUMENTS

| | | |
|---|---|---|
| JP | 2002-222589 A | 8/2002 |
| JP | 2004-086986 A | 3/2004 |
| JP | 2004-318330 A | 11/2004 |
| JP | 2006-171952 A | 6/2006 |
| JP | 2007-034554 A | 2/2007 |
| JP | 2007-241625 A | 9/2007 |

* cited by examiner

MICROCOMPUTER AND MICROCOMPUTER SYSTEM

CROSS-REFERENCE TO RELATED APPLICATIONS

This application is based upon and claims the benefit of priority from Japanese patent application No. 2014-159261, filed on Aug. 5, 2014, the disclosure of which is incorporated herein in its entirety by reference.

BACKGROUND

The present invention relates to a microcomputer and a microcomputer system.

In general, a single-chip microcomputer has a plurality of functional blocks, such as a central processing unit (CPU) as a main unit, and a read only memory (ROM) for storing programs, a random access memory (RAM) for storing data, and an input/output circuit for inputting and outputting data or signals, which are formed on one semiconductor substrate.

The single-chip microcomputer is used for controlling various apparatuses. The single-chip microcomputer controls an engine or the like, for example, via the input/output circuit. During this control, even when the input/output circuit enters an undesired state, it is necessary to prevent malfunction or failure in a control target like the engine. For example, a technique of blocking the output of a timer which is one of input/output circuits to stop the control target has been proposed (Japanese Unexamined Patent Application Publication No. H8-263104).

Moreover, the single-chip microcomputer can construct a high speed and low power consumption system by executing a program on a ROM. In this case, as compared to a scheme which uses an external memory, it is easy to conceal the program content or suppress falsification. However, since a plurality of functional blocks including the ROM have to be formed on one semiconductor substrate, the volume of the ROM that can be mounted is limited. For example, the ROM volume of a single-chip microcomputer is smaller than the storage volume of a hard disk of a personal computer. Thus, in the single-chip microcomputer, it is necessary to select a program and data to be stored in the ROM by taking the ROM volume into consideration. Flash memories are increasingly included as the ROM of the single-chip microcomputer. Since a flash memory can rewrite, whenever necessary, the content stored therein, it is possible to perform debugging, tuning, and upgrading and to improve the usability. For example, the program and data to be stored can be selected appropriately by taking an actual usages into consideration.

In recent years, a magnetoresistive random access memory (MRAM) has been proposed as a memory (nonvolatile random access memory: NVRAM) that is random-accessible and can store information in a nonvolatile manner (Japanese Unexamined Patent Application Publication No. 2002-222589 and Japanese Unexamined Patent Application Publication No. 2004-86986). Data can be read and written (random-accessed) from and to an MRAM similarly to an ordinary RAM. Moreover, it is not necessary to erase data before writing data. As a substitute for a ROM storing data requiring saving and programs in a single-chip microcomputer and a RAM serve as a temporary storage area during work, an MRAM may be included, which can be used to store programs and data requiring saving and also used to serve as a temporary storage area during work.

In a microcomputer, programs and a program (boot program) for writing fixed data may be stored in a rewritable memory (flash memory or NVRAM) that can store data in a nonvolatile manner, and it may be inhibited to read and write data from and to a boot program area during a normal operation. In this way, the boot program area is protected. When a microcomputer is set to a predetermined operation mode (boot mode), the microcomputer executes the boot program to write programs and fixed data (Japanese Unexamined Patent Application Publication No. 2004-318330).

Moreover, a method of performing rewriting when an undesired power failure or the like occurs in a microcomputer or a rewritable and nonvolatile memory during execution of a boot program and it is not possible to properly write data to the memory has been proposed (Japanese Unexamined Patent Application Publication No. 2001-27954). Moreover, a method of controlling writing to a flash memory has been proposed (Japanese Unexamined Patent Application Publication No. 2007-34554).

Further, a technique of performing improper instruction exception handling to execute a predetermined program again after initialization, for example, in order to cope with execution of improper instruction codes due to noise occurring in a microcomputer has been proposed (Japanese Unexamined Patent Application Publication No. 2006-171952). Moreover, a method of performing self-diagnosis in order to detect a failure in hardware of a microcomputer has also been proposed.

In memories such as flash memories, defects may occur due to a failure or deterioration in some memory devices. To cope with such defects, a memory in which an error check and correction (ECC) function is applied to provide redundancy so that the memory can perform a normal operation even when defects occur in some memory devices is proposed (Japanese Unexamined Patent Application Publication No. 2007-241625).

SUMMARY

The present inventor has found out new problems described below. During operation of a microcomputer, since programs that have been debugged are executed, essentially improper instruction codes are not to be executed. However, due to an undesired error such as noise, when a normal instruction code (for example, H'0000) is changed to another instruction code (for example, H'1000), an improper instruction code is executed. When the instruction code generated by the change is not defined in the CPU of the microcomputer, improper instruction exception handling is executed.

In contrast, if the instruction code generated by the change is defined in the CPU of the microcomputer, improper instruction exception handling is not executed and the improper instruction code generated by the change is executed. This means that, even when improper instruction exception handling is executed by the microcomputer, there is a possibility that the improper instruction code generated by the change may have been executed before the improper instruction exception handling is executed. That is, there is a possibility that original data that is to be stored in an NVRAM may be rewritten to undesired data when the improper instruction code is executed. In this case, since the data itself is changed, the data cannot be recovered even if the microcomputer is reset. As described above, if programs stored in the NVRAM and data that requires saving are rewritten, the microcomputer may not perform a normal operation. Moreover, if the microcomputer operates in this state, abnormal operations are executed repeatedly.

Thus, it is necessary to detect undesired data rewriting to the NVRAM resulting from execution of an improper instruction code. Moreover, it is desirable to recover the rewritten data to original data that is to be stored.

Other objects and new features will become apparent from the description of the present specification and the accompanying drawings.

According to an embodiment, there is provided a microcomputer that has a plurality of functional blocks and includes: a nonvolatile memory to which first data has been written in advance; a central processing unit that processes information read from the nonvolatile memory or writes information to the nonvolatile memory; an abnormality detecting unit that detects an abnormality in exchange of data between the plurality of functional blocks; and a nonvolatile memory checking unit that, when the abnormality detecting unit has detected an abnormality, compares the first data with second data indicating the content of the first data when written to the nonvolatile memory and detects an abnormality in the nonvolatile memory when a result of the comparison shows that the first data is not identical to the second data.

According to another embodiment, there is provided a microcomputer system including: a control target device and a microcomputer that controls the operation of the control target device, the microcomputer including: a nonvolatile memory to which first data has been written in advance; a central processing unit that processes information read from the nonvolatile memory or writes information to the nonvolatile memory; an abnormality detecting unit that detects an abnormality in exchange of data between the plurality of functional blocks; and a nonvolatile memory checking unit that, when the abnormality detecting unit has detected an abnormality, compares the first data with second data indicating the content of the first data when written to the nonvolatile memory and detects an abnormality in the nonvolatile memory when a result of the comparison shows that the first data is not identical to the second data.

According to the embodiments, it is possible to detect undesired rewriting of the data stored in a nonvolatile memory.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
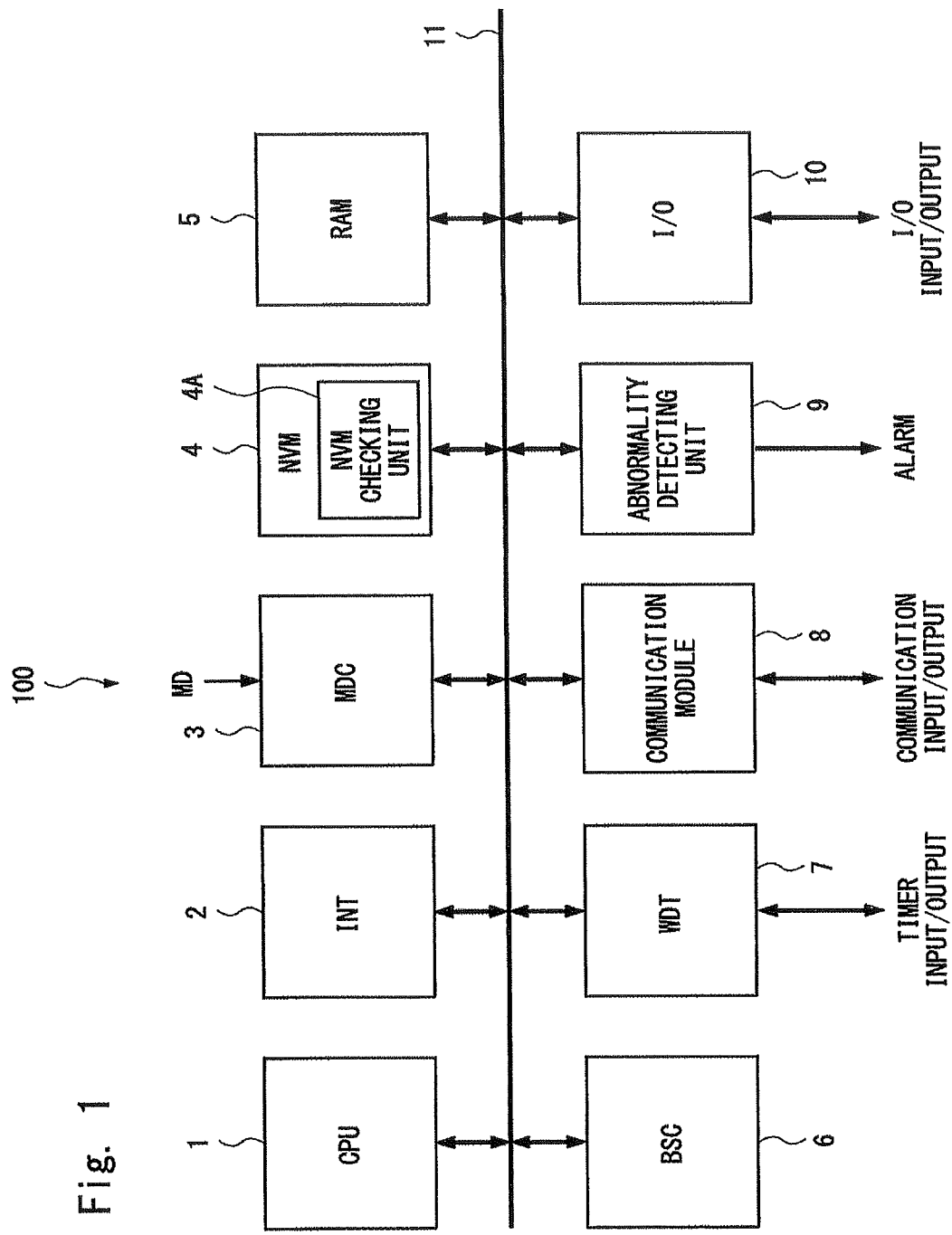
FIG. 1 is a block diagram schematically illustrating a configuration of a microcomputer according to a first embodiment.

Hereinafter, embodiments of the present invention will be described with reference to the drawings. In the respective diagrams, the same constituent elements are denoted by the same reference numerals, and redundant description thereof will not be provided as necessary.

First Embodiment

Figure 2:
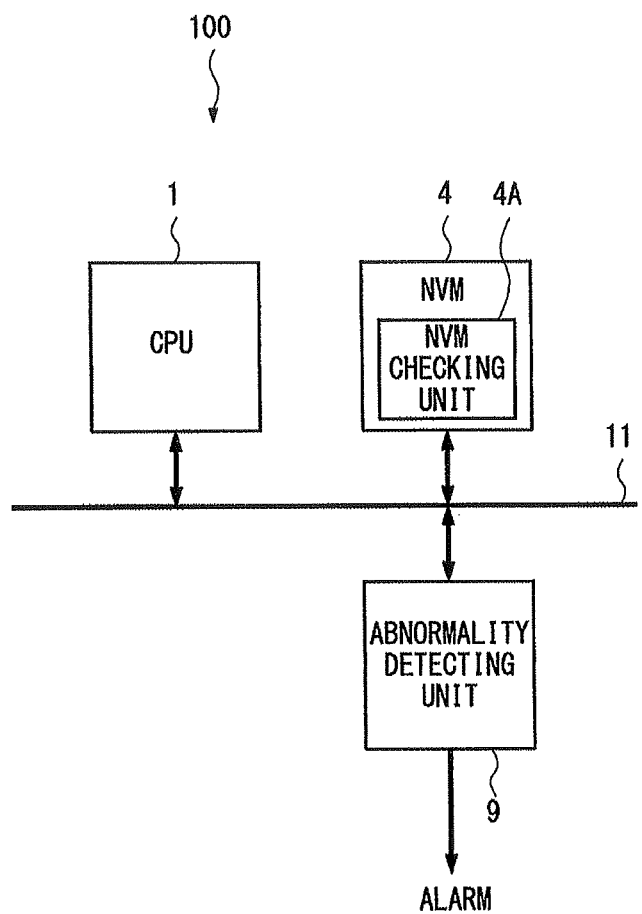
FIG. 2 is a block diagram schematically illustrating a basic configuration of the microcomputer according to the first embodiment.

A microcomputer 100 according to a first embodiment will be described. The microcomputer 100 can be configured as a single-chip microcomputer. FIG. 1 is a block diagram schematically illustrating a configuration of the microcomputer 100 according to the first embodiment. FIG. 2 is a block diagram schematically illustrating a basic configuration of the microcomputer 100 according to the first embodiment. Hereinafter, the configuration of the microcomputer 100 will be described with reference to FIG. 1. The microcomputer will be referred to as a micro-controller unit (MCU).

The MCU 100 includes a central processing unit (CPU) 1, an interrupt controller (hereinafter referred to as an INT) 2, a mode controller (MDC) 3, a nonvolatile memory (NVM) 4, a random access memory (RAM) 5, a bus controller (hereinafter referred to as a BSC) 6, a timer (WDT) 7, a communication module 8, an abnormality detecting unit 9, an input/output port (I/O) 10, and an internal bus 11. A serial communication interface or the like is provided as the communication module 8, for example. Moreover, although not illustrated, the MCU 100 may include other functional blocks and modules such as, for example, an analog module, a clock oscillator (CPG), or the like. Moreover, the MCU 100 further includes input terminals for a mode input signal MD, a reset input RES, and an interrupt input NMI, which are not illustrated. An analog/digital (A/D) converter, a digital/analog (D/A) converter, and the like are provided as the analog module, for example.

The CPU 1 is the subject of the operation of the MCU 100. The CPU 1 performs an operation by reading instructions mainly from the NVM 4 and reads and writes data from and to the RAM 5, the I/O 10, and the like as a work data area. The MCU 100 realizes necessary processing by executing programs in the CPU 1.

The CPU 1 aborts processing in execution by performing improper instruction exception handling and interrupt exception handling, jumps to an exception handling routine from an address represented by a predetermined vector, and starts the execution. The jumping destination is selected by an operation mode signal MDS supplied from the MDC 3.

Figure 3:
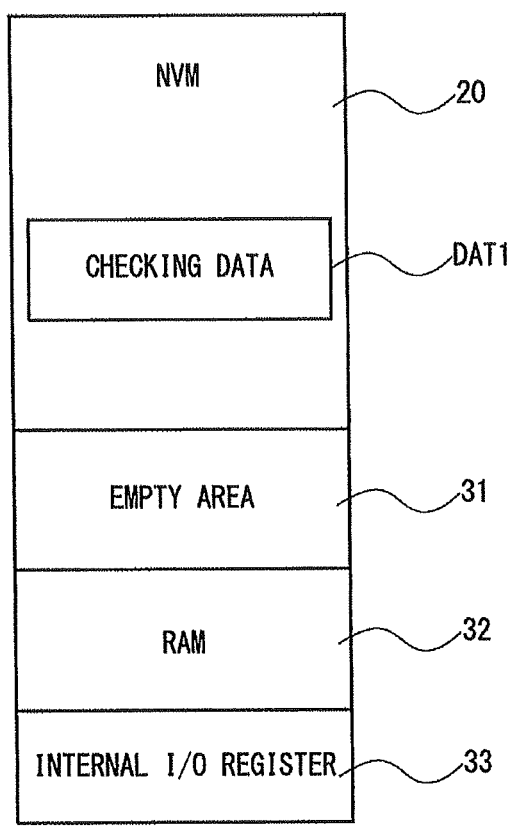
FIG. 3 is a diagram illustrating an address space of a CPU of the microcomputer according to the first embodiment.

FIG. 3 is a diagram illustrating an address space of the CPU 1. Addresses are allocated to the address space of the CPU 1 linearly from one end to the other end. An NVM address area 20, an empty area 31, a RAM area 32, and an internal I/O register area 33 are arranged in the address space so as to correspond to internal resources of the MCU 100. The internal I/O register area 33 is an area corresponding to the registers possessed by the BSC 6, the MDC 3, the INT 2, the WDT 7, and the communication module 8. The volumes of respective address areas can be set appropriately depending on an application field or the like to which the MCU 100 is applied. Checking data DAT1 (also referred to as first data) described later is allocated to the NVM address area 20.

Returning to FIG. 1, the configuration of the MCU 100 will be described. When an error signal or another signal is input, the INT 2 supplies an interrupt request to the CPU 1 in response to the input signal. When the interrupt request is supplied, the CPU 1 performs interrupt exception handling during a break in instructions.

The MDC 3 receives a mode input signal MD from an external device, for example, and designates an operation mode of the MCU 100. The MDC 3 outputs an operation mode signal MDS to respective functional blocks in the MCU (for example, the CPU 1, the NVM 4, and the BSC 6) to control the operation of the CPU 1, the NVM 4, the BSC 6, and the like.

The NVM 4 includes an NVM checking unit 4A that performs a function of controlling the NVM 4 itself. The NVM 4 starts erase and write operations according to a command or the like from the CPU 1. During a write operation, the NVM checking unit 4A can generate checking data DAT1 (first data) such as a check sum or a cyclic code according to the writing content and write the generated checking data DAT1 (first data) to a predetermined area of the NVM 4. The NVM 4 operates as a read-only memory (ROM) in a state other than during the erase and write operation.

The RAM 5 is used as a work area of the CPU 1. Moreover, the RAM 5 is used for temporarily storing a writing content during rewriting of the NVM 4.

The BSC 6 controls the operation of the internal bus 11 according to an access content of the CPU 1 and an operation mode signal MDS from the MDC 3.

Although not illustrated, the WDT 7 includes a counter and other control registers.

The communication module 8 has a function corresponding to a necessary system and performs communication with external devices. The communication module 8 may have a plurality of types of communication means (communication schemes).

The I/O 10 has various input/output functions and operates according to a program executed by the CPU 1. The I/O 10 receives the state of a control target as an analog signal or an encode signal and outputs a pulse signal or an analog signal to control the control target. The I/O includes an output control block and the output control block receives an error signal and switches an output state to a predetermined state such as an inactive state corresponding to the control target when the error signal is activated. The predetermined state may be a fixed state, and alternatively, may be set in advance by the CPU executing a program.

The abnormality detecting unit 9 performs testing of a predetermined target functional block or checks an expected value to detect an abnormality occurring in exchange of data between respective functional blocks in the MCU 100. When an abnormal checking result is obtained, the abnormality detecting unit 9 outputs an error signal. The error signal may include a plurality of signals depending on the number of blocks in which an abnormality is detected or the number of checking methods. The abnormality detecting unit 9 can transmit the error signal to respective functional blocks in the MCU 100 via the internal bus 11. Moreover, the abnormality detecting unit 9 may transmit the error signal to an external device of the MCU 100 via the communication module 8. Further, the abnormality detecting unit 9 can transmit an alarm signal to an external device of the MCU 100 when an abnormality is detected.

Here, an abnormality occurring in exchange of data between respective functional blocks, detected by the abnormality detecting unit 9 means an abnormality occurring in the data in each functional block and an abnormality in transmission and reception of data via the internal bus 11. In the following description, an abnormality occurring in exchange of data between respective functional blocks, detected by the abnormality detecting unit 9 will be referred to as a data abnormality.

Although FIG. 1 illustrates the abnormality detecting unit 9 as an independent functional block connected to other functional blocks via the internal bus 11, this is an example only. That is, the abnormality detecting unit 9 may be provided in another functional block (the CPU 1, the INT 2, the MDC 3, the NVM 4, the RAM 5, the BSC 6, the WDT 7, the communication module 8, and the I/O 10). Moreover, the number of abnormality detecting units 9 is not limited to one, but the abnormality detecting unit 9 may be provided in some or all of the other functional blocks. When a plurality of abnormality detecting units are provided, respective abnormality detecting units may correspond to different checking methods and different checking targets.

Figure 4:
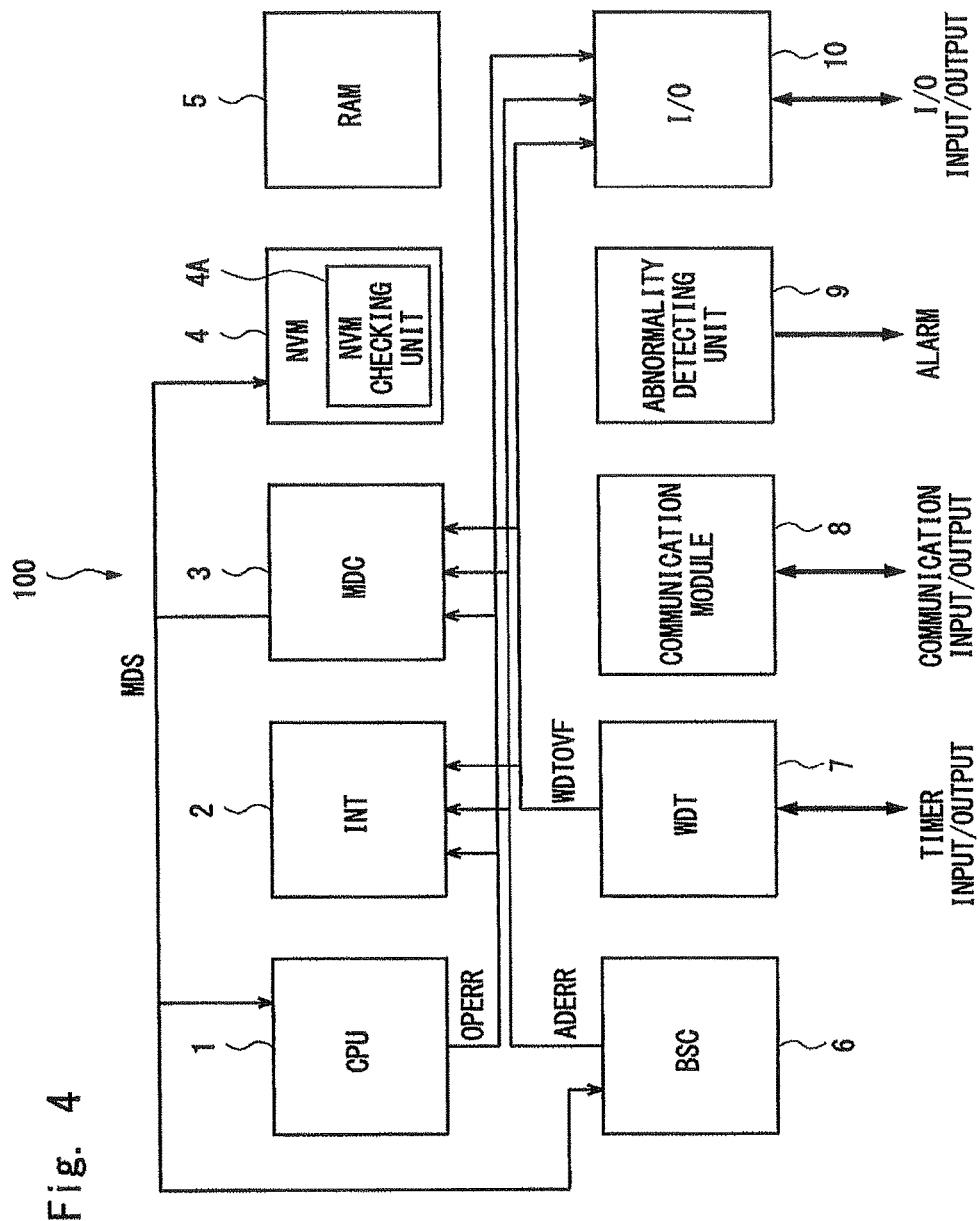
FIG. 4 is a diagram illustrating the exchange of signals in the microcomputer according to the first embodiment.

Here, an example of an abnormality detecting operation of the abnormality detecting unit 9 will be described. FIG. 4 is a diagram illustrating exchange of signals in the MCU according to the first embodiment.

First Example of Abnormality Detecting Unit 9: Improper Instruction Detection The abnormality detecting unit 9 can detect an improper instruction of the CPU 1, for example. In this case, the abnormality detecting unit 9 may be included in the CPU 1. The abnormality detecting unit 9 checks an instruction to be executed, and when the instruction is not defined, detects the checking target instruction as an improper instruction. When an improper instruction is detected, the abnormality detecting unit 9 activates an instruction error signal OPERR which is one of error signals and generates predetermined exception handling (improper instruction exception handling). In improper instruction exception handling and exception handling corresponding to error detection described later, a predetermined program on the NVM 4 may be executed.

Second Example of Abnormality Detecting Unit 9: Address Error Detection

The abnormality detecting unit 9 can detect an address error during the bus operation of the BSC 6, for example. In this case, the abnormality detecting unit 9 may be included in the BSC 6. The abnormality detecting unit 9 checks an access content of the CPU 1, and when the checking target access is an abnormal access, detects the address error. When the address error is detected, the abnormality detecting unit 9 activates an address error signal ADERR which is one of error signals and transmits the address error signal to the INT 2. An abnormal access means read and write of data from and to an address (empty area) in which a resource is not disposed and to which an access is inhibited and a read of a program from an internal I/O register area.

Third Example of Abnormality Detecting Unit 9: Counter Error Detection

The abnormality detecting unit 9 can detect a counter error of the WDT 7, for example. In this case, the abnormality detecting unit 9 may be included in the WDT 7. As long as the CPU 1 operates normally, the CPU 1 operates to write 0 or the like to a counter before a counter overflows to suppress an overflow. However, if the CPU 1 cannot perform an operation normally due to undesirable factors such as temporarily malfunction or circuit failure due to noise or the like, the counter overflows. The abnormality detecting unit 9 can detect an overflow of a counter and activate an overflow signal WDTOVF which is one of error signals.

As described above, when the abnormality detecting unit 9 detects an abnormality, the abnormality detecting unit 9 can activate an instruction error signal OPERR, an address error signal ADERR, an overflow signal WDTOVF, and the like. The INT 2 supplies an interrupt request to the CPU 1 in response to the instruction error signal OPERR, the address error signal ADERR, and the overflow signal WDTOVF. Moreover, the INT 2 may supply the interrupt request to the CPU 1 even when a non-maskable interrupt NMI input from an external device and other signals as well as the error signal are input. The address error signal ADERR is handled as a non-maskable interrupt. Then the interrupt request is supplied, the CPU 1 can perform interrupt exception handling during a break in instructions.

When interrupt exception handling is performed in response to an error signal, an output state of the I/O 10 corresponding to a functional block in which an error has occurred may be set to a predetermined state such as an inactive state. This may be realized by hardware (for example, the I/O 10) in response to the error signal and may be realized by the CPU 1 executing a program. When a plurality of error signals are activated, a plurality of output states corresponding to the activated error signals may be set to a predetermined state such as an inactive state. By deactivating the output state of the I/O 10, it is possible to prevent the I/O 10 from transmitting a wrong signal to an external device and malfunction based on wrong data according to the signal input via the I/O 10.

Figure 5:
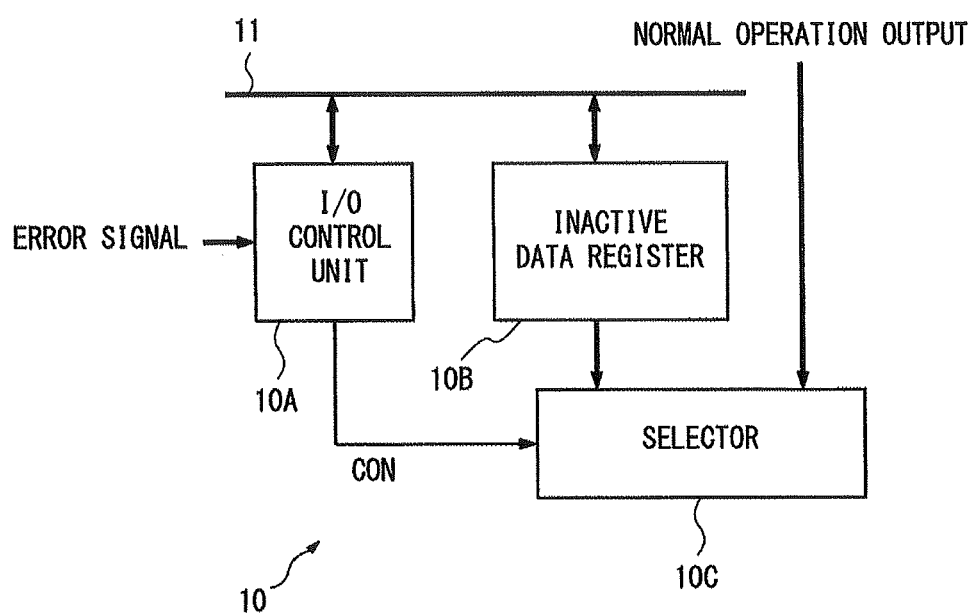
FIG. 5 is a block diagram illustrating a configuration example of an I/O included in the microcomputer according to the first embodiment.

FIG. 5 is a block diagram illustrating a configuration example of the I/O 10 included in the MCU 100 according to the first embodiment. The I/O 10 includes an I/O control unit 10A, an inactive data register 10B, and a selector 10C. The I/O control unit 10A outputs a control signal CON to the selector 10C in response to an error signal to control the operation of the selector 10C. When the error signal is inactive, the I/O control unit 10A causes the selector 10C to output a normal operation output to an external device. When the error signal is activated, the I/O control unit 10A causes the selector 10C to output the output of the inactive data register 10B to an external device. By doing so, when the error signal is activated, the selector 10C is separated from the normal operation output and is connected to the fixed output of the inactive data register 10B. As a result, even when an error occurs in the MCU 100, the I/O 10 is stopped (deactivated).

When an error is detected by the MCU 100, the MCU 100 may not perform a desired operation and a wrong signal is output from the I/O 10 to an external device. Moreover, the MCU 100 may malfunction in response to a signal input from an external device via the I/O 10. In this case, a control target controlled by the MCU 100 via the I/O 10 may enter an undesirable control state. However, as described above, by stopping the I/O 10 in the event of an error, it is possible to prevent exchange of data between the MCU 100 and the control target and to stop the control target, for example, to prevent the control target from entering an undesirable state.

Figure 6:
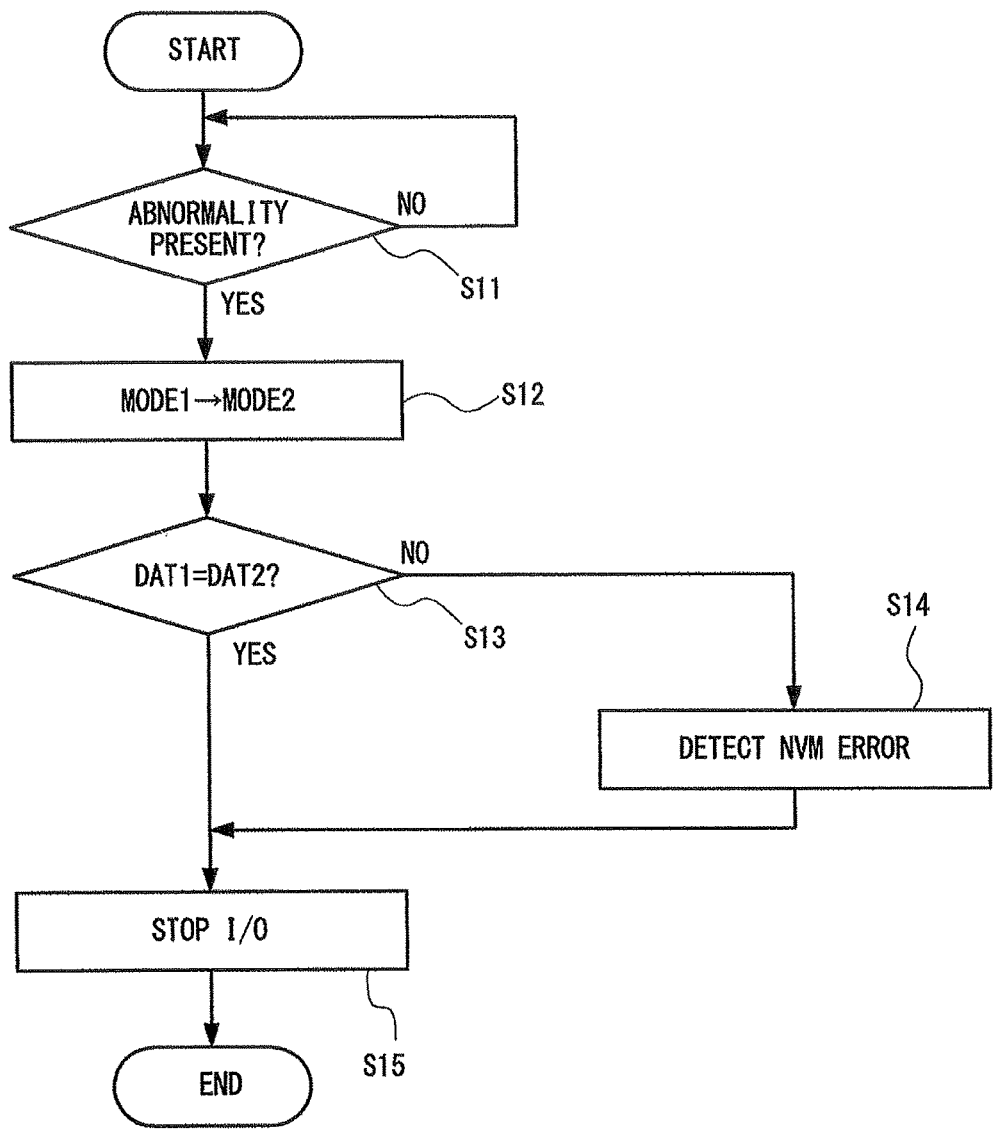
FIG. 6 is a flowchart illustrating the operation of the microcomputer according to the first embodiment.
Figure 7:
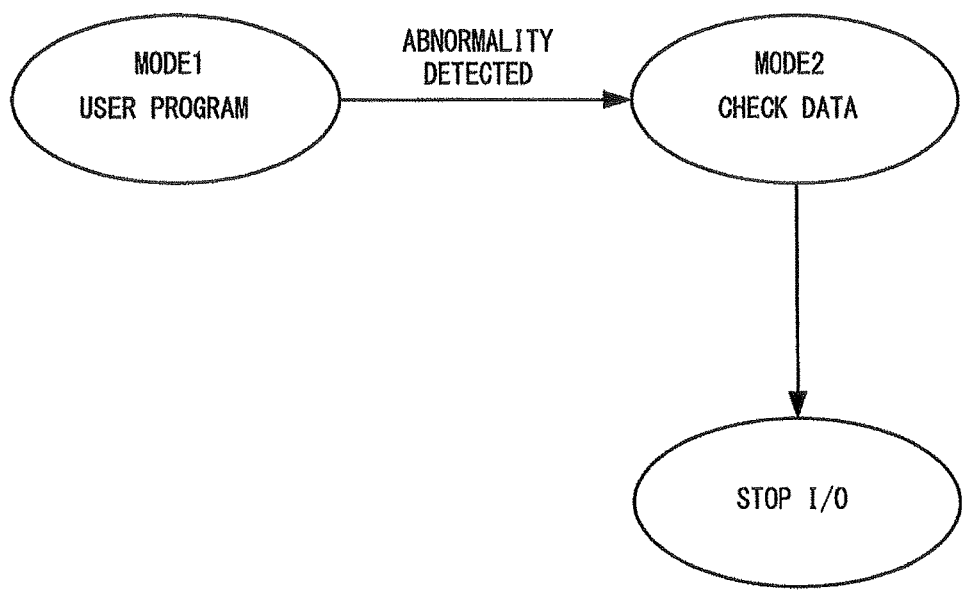
FIG. 7 is a state transition diagram of the microcomputer according to the first embodiment.

Next, the operation of the MCU 100 will be described. FIG. 6 is a flowchart illustrating the operation of the MCU 100 according to the first embodiment. FIG. 7 is a state transition diagram of the MCU 100 according to the first embodiment.

Step S11

In the MCU 100, the abnormality detecting unit 9 always monitors whether an error has occurred in exchange of data between functional blocks via the internal bus 11 (first operation mode MODE1 in FIG. 7).

Step S12

When an error has occurred in exchange of data between functional blocks via the internal bus, the abnormality detecting unit 9 detects an abnormality. The abnormality detecting unit 9 can notify an external device of the abnormality detected. When an abnormality is detected, the MCU 100 transitions from the first operation mode MODE1 to a second operation mode MODE2.

Step S13

When an error has occurred in exchange of data between functional blocks, the NVM checking unit 4A checks the data of the NVM 4. The NVM checking unit 4A reads checking data DAT1 (first data) which has been checked in advance in the NVM 4 from a checking data address included in the address area of the NVM 4. Moreover, the NVM checking unit 4A determines whether reference data DAT2 (also referred to as second data) stored in advance is identical to the read checking data DAT1 (first data). The reference data DAT2 (second data) is data indicating the original content of the checking data DAT1 (first data) written to the NVM 4, and in other words, is data indicating an expected value of the checking data DAT1 (first data).

Step S14

When the reference data DAT2 (second data) is not identical to the checking data DAT1 (first data), since there is a problem in writing of data to the NVM 4 which has been performed before an abnormality is detected, the NVM checking unit 4A detects an NVM error and transmits an alarm signal, for example. After that, the flow proceeds to step S15.

Step S15

When the reference data DAT2 (second data) is identical to the checking data DAT1 (first data), or after step S14 is performed, the I/O 10 is stopped (deactivated) and transmission of wrong data to an external device of the MCU 100 is prevented. After this operation ends, an operation is resumed appropriately from a reset process or the like.

According to this configuration, when a data abnormality occurs inside an MCU, it is possible to detect whether an abnormality has occurred in data written to an NVM before the abnormality occurs. As a result, it is possible to perform countermeasures appropriate for the NVM error, for example, by rewriting correct data to the NVM or transmitting an instruction to recover the NVM from an external device.

In particular, since it is possible to detect an NVM error using a single MCU and a single NVM only, it is possible to suppress an NVM error from being overlooked without increasing the cost such as an increase in a chip size.

Second Embodiment

An MCU 200 according to a second embodiment will be described. The MCU 200 has the same configuration as the MCU 100 but the address space and operation of the CPU 1 are different from those of the MCU 100. The MCU 200 performs an operation of recovering the NVM when an NVM error is detected.

Figure 8:
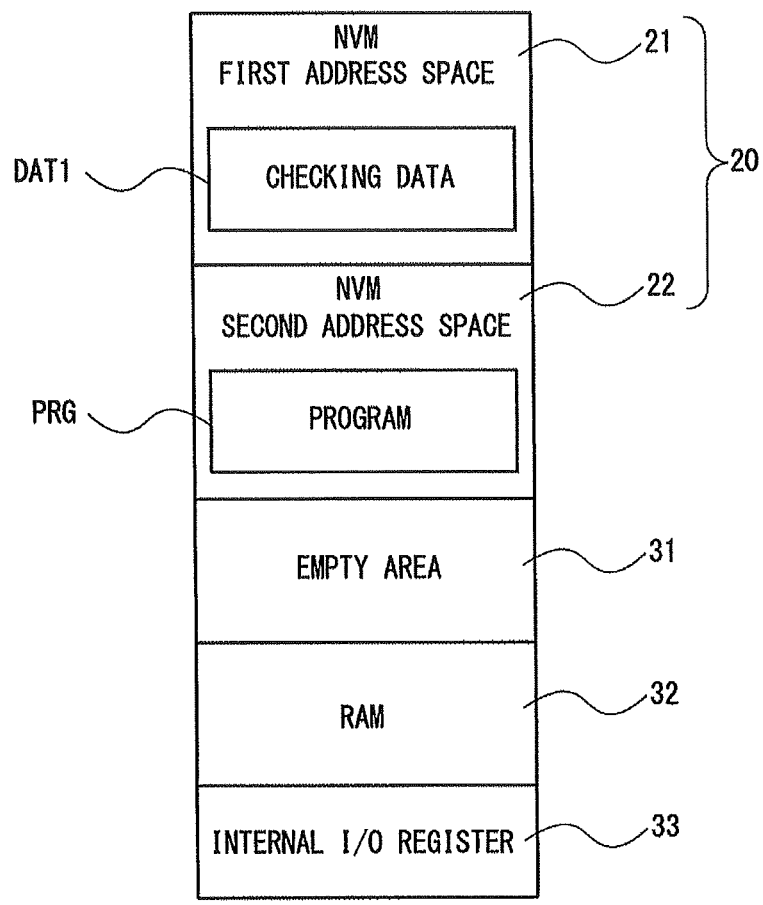
FIG. 8 is a diagram illustrating an address space of a CPU of a microcomputer according to a second embodiment.

FIG. 8 is a diagram illustrating an address space of the CPU 1 of the MCU 200 according to the second embodiment. In the present embodiment, an NVM address area 20 within the address space of the CPU 1 is divided into a first address area 21 and a second address area 22. The first address area 21 stores a program (user program) for allowing the MCU 200 to perform necessary processes. Moreover, the first address area includes an address in which checking data DAT1 (first data) such as checksum data used in a data checking operation of the NVM 4 is stored. The second address area 22 stores programs PRG (a boot program and a recovery program) executed in a boot mode and a recovery mode.

Figure 9:
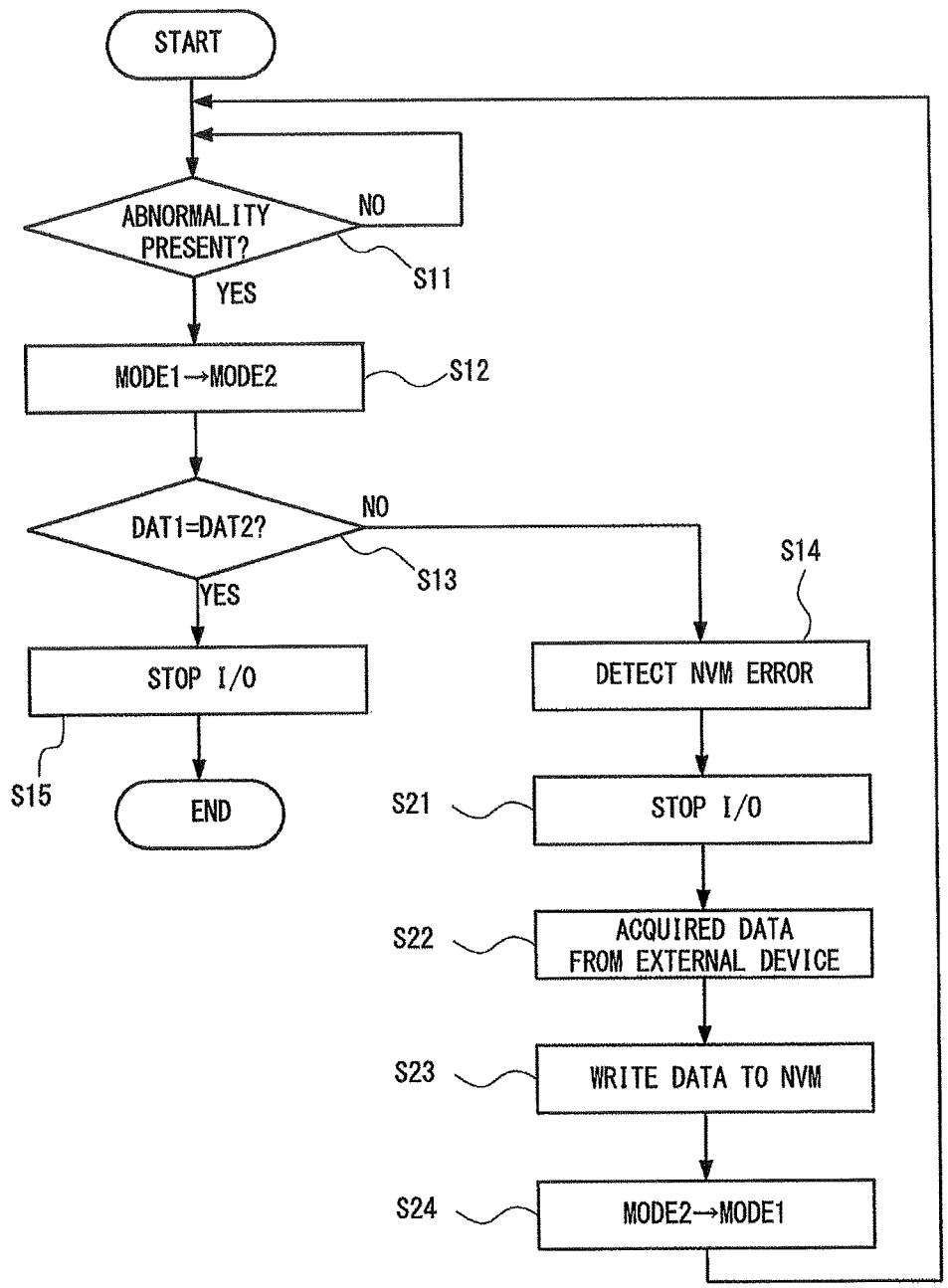
FIG. 9 is a flowchart illustrating the operation of the microcomputer according to the second embodiment.
Figure 10:
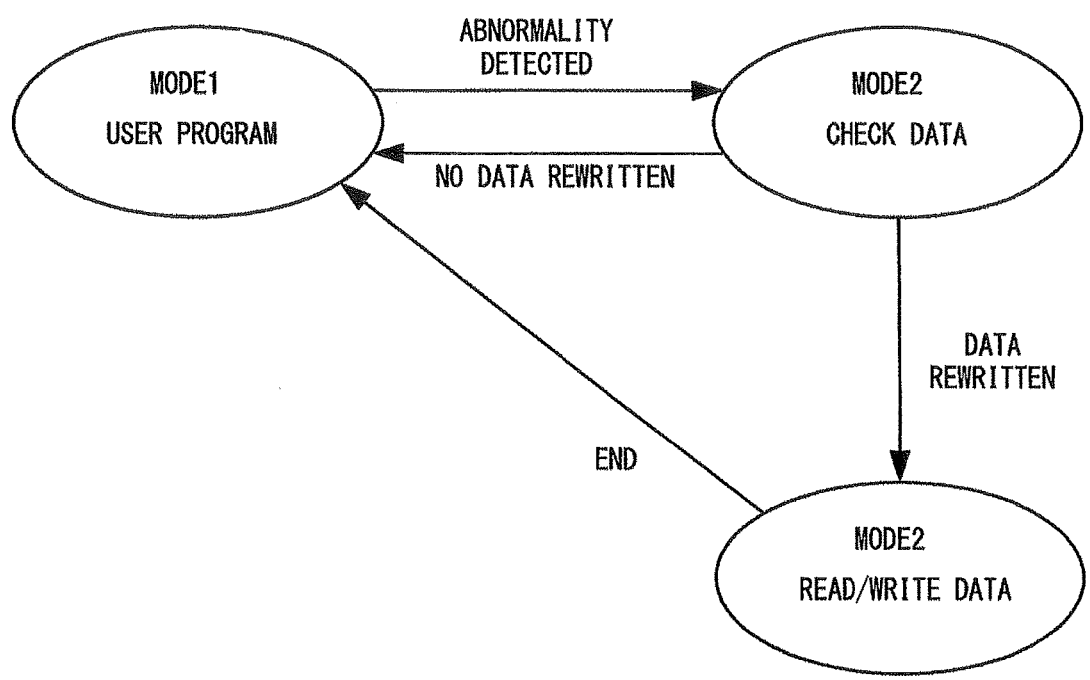
FIG. 10 is a state transition diagram of the microcomputer according to the second embodiment.

Next, the operation of the MCU 200 will be described. FIG. 9 is a flowchart illustrating the operation of the MCU 200 according to the second embodiment. FIG. 10 is a state transition diagram of the MCU 200 according to the second embodiment. The operation of the MCU 200 further includes steps S21 to S24 in addition to steps S11 to S15 illustrated in FIG. 6. Hereinafter, the added steps S21 to S24 will be described mainly.

In the MCU 200, the abnormality detecting unit 9 always monitors whether an error has occurred in exchange of data between functional blocks via the internal bus 11 (first operation mode MODE1 in FIG. 10). In the first operation mode MODE1, the BSC 6 can read and write data from and to the first address area 21 according to a program executed by the CPU 1. Moreover, in the first operation mode MODE1, a data write to the second address area 22 of the NVM address area 20 is inhibited. Thus, when a data write to the second address area 22 occurs, the BSC 6 detects an address error. That is, in the first operation mode MODE1, the content of the second address area 22 is protected. For example, when the NVM 4 is a flash memory or the like and data can be erased or written according to a predetermined command or the like, erasure and writing are inhibited by inhibiting writing. The NVM 4 itself rather than the BSC 6 may receive an operation mode signal to inhibit writing.

Step S11

Step S11 is the same as that of FIG. 6 and description thereof will not be provided.

Step S12

Step S12 is the same as that of FIG. 6. However, in the present embodiment, when the MCU enters the second operation mode MODE2, data can be read and written from and to the first address area 21 and the second address area 22. Due to this, the CPU 1 can read a recovery program PRG from the second address area 22, execute the program, write data to the first address area 21, and check the data.

Steps S13 to S15

Steps S13 to S15 are the same as those of FIG. 6 and description thereof will not be provided.

Step S21

The CPU 1 executes the recovery program whereby operations subsequent to step S21 are performed.

When an NVM error is notified in step S14, the I/O 10 is stopped similarly to step S15.

Step S22

The CPU 1 receives data that is to be written to the NVM 4 from an external device via the communication module 8 from an external device.

Step S23

The CPU 1 writes the data received from the external device to the NVM 4.

Step S24

After that, the MCU enters the first operation mode MODE1 to return to a normal operation. A reset process may be executed appropriately. In this case, the I/O 10 is activated.

According to this configuration, when an NVM error is detected, data that is originally to be written to the NVM 4 is acquired from an external device and rewritten to the NVM 4 whereby the data of the NVM 4 can be recovered. By doing so, the MCU 100 can quickly enter the normal operation state after the NVM is recovered.

Before executing the recovery program PRG in the second operation mode MODE2, the content of the recovery program PRG itself may be checked. This is because there is a possibility that the data stored in the NVM 4 is lost.

When an execution start address of an individual program is designated by the INT 2, a recovery program in the second operation mode MODE2 may be implemented by being divided into a plurality of interrupt processing routines according to the designated address.

By executing the recovery program in the second operation mode MODE2, it is possible to conceal the content of programs stored in the second address area 22 and to prevent undesired falsification. By doing so, the user of an MCU can enjoy only the convenience of the NVM recovery without considering the program content.

Third Embodiment

Figure 11:
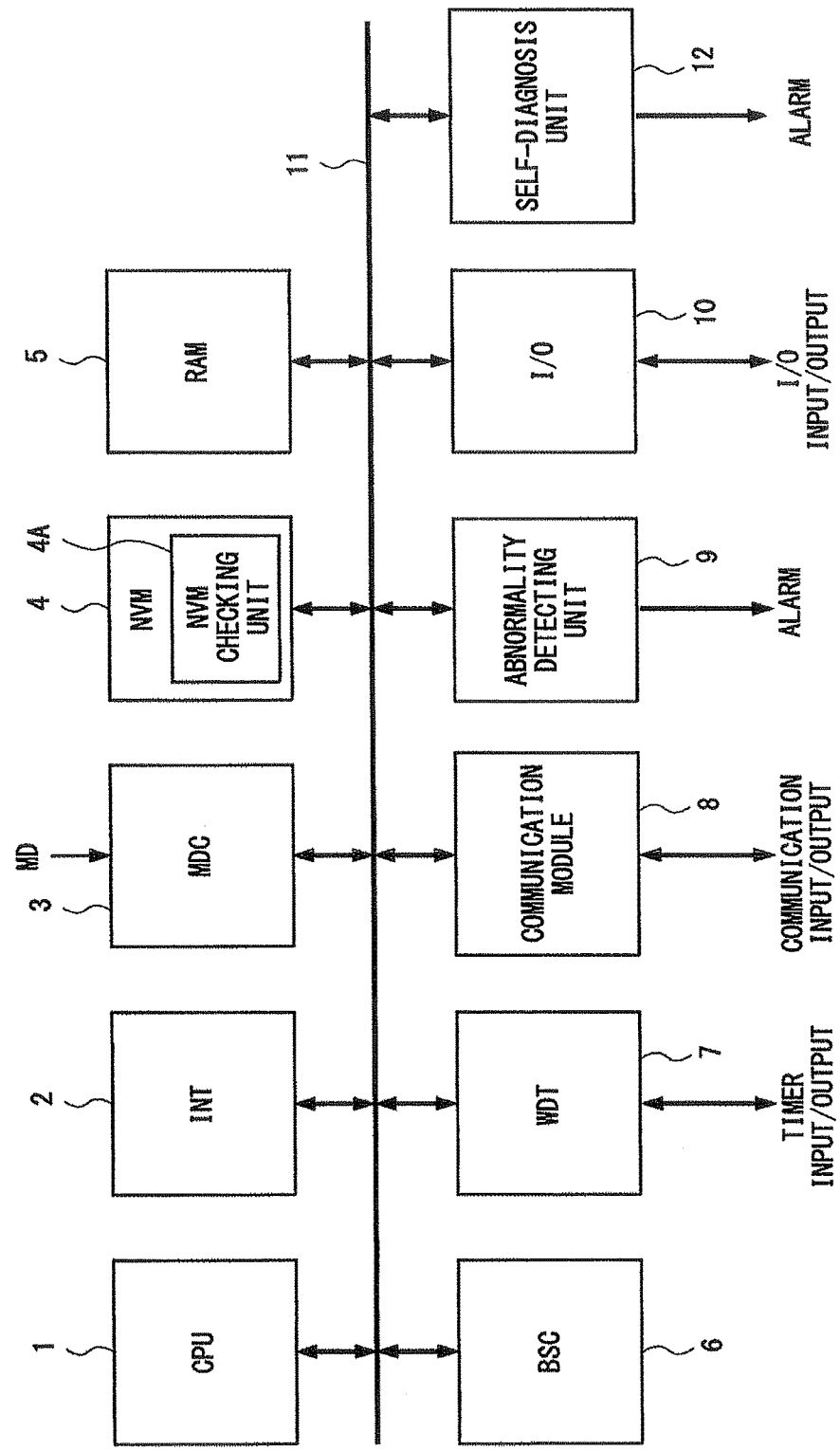
FIG. 11 is a block diagram schematically illustrating a configuration of a microcomputer according to a third embodiment.

An MCU 300 according to a third embodiment will be described. FIG. 11 is a block diagram schematically illustrating the configuration of the MCU 300 according to the third embodiment. The MCU 300 further includes a self-diagnosis unit 12 in addition to the configuration of the MCU 100. The other configuration of the MCU 300 is the same as that of the MCU 100 and description thereof will not be provided.

The self-diagnosis unit 12 diagnoses whether an abnormality occurs in the function of each functional block when the abnormality detecting unit 9 has detected data abnormality. When an abnormality has occurred in the function of any one functional block, the self-diagnosis unit 12 detects a self-diagnosis error. The self-diagnosis unit 12 can notify other functional blocks and an external device of the MCU 300 of the self-diagnosis error in the form of an alarm signal or the like.

Self-diagnosis can detect a failure in a target functional block by comparing a value output from the functional block with an expected value and determining whether both values are identical, for example. Moreover, self-diagnosis can detect a failure in a target functional block or the like by duplicating the function implemented in the functional block or the like and determining whether the output results of the duplicated functions are identical, for example. Further, self-diagnosis can detect a failure associated with a predetermined data route by applying ECC to the data route and detecting an ECC error when reading and writing data in the data route, for example.

Figure 12:
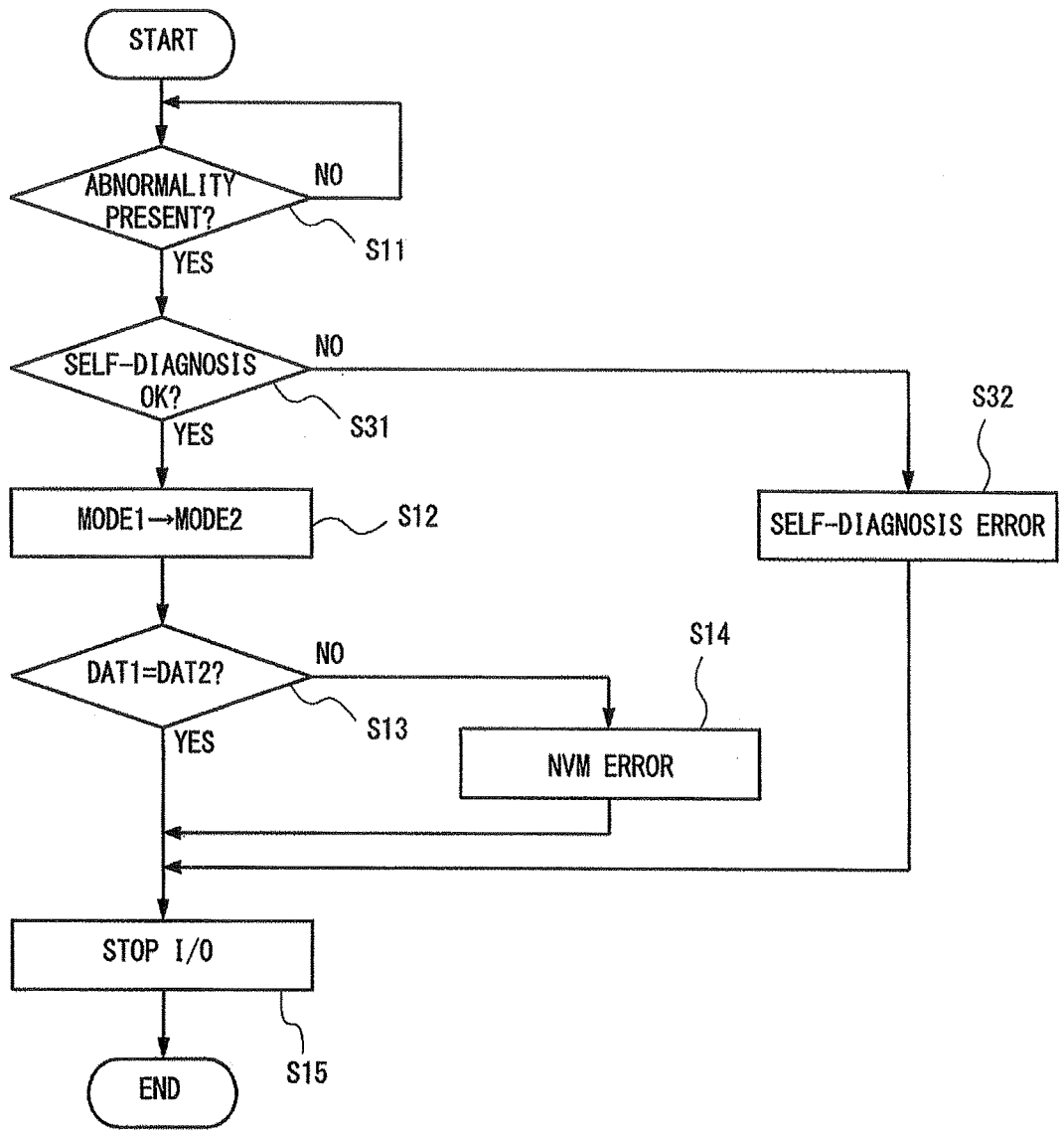
FIG. 12 is a flowchart illustrating the operation of a microcomputer according to the third embodiment.

Next, the operation of the MCU 300 will be described. FIG. 12 is a flowchart illustrating the operation of the MCU 300 according to the third embodiment. The operation of the MCU 300 further includes steps S31 and S32 in addition to steps S11 to S15 illustrated in FIG. 6.

Step S11

Step S11 is the same as that of FIG. 6 and description thereof will not be provided.

Step S31

When a data error has been detected, the self-diagnosis unit 12 diagnoses whether an abnormality has occurred in the function of each functional block.

Step S32

When an abnormality has occurred in any one of the functions of the functional blocks, the self-diagnosis unit 12 detects a self-diagnosis error. The self-diagnosis unit 12 can notify other functional blocks and the external device of the MCU 300 of the self-diagnosis error. After that, the flow proceeds to step S15.

Steps S12 to S15

When a self-diagnosis error has not been detected, the flow proceeds to step S12 and the same operations as FIG. 6 are performed.

According to this configuration, it is possible to detect and discriminate whether the cause of the data error is a functional abnormality of a functional block or an NVM error. As a result, when an abnormality occurs in an MCU, it is possible to easily establish countermeasure to recover abnormalities. Examples of a circuit failure include wire disconnection and a transistor breakdown and this state continues. Due to this, a case in which it is difficult to execute a desired program in a desired period may happen. In this case, since an NVM error and a failure can be detected and discriminated by the self-diagnosis as described above, it is possible to perform recovery corresponding to a circuit failure.

A case in which self-diagnosis cannot be performed in a normal operation state may be considered. That is, even when a circuit failure is detected by self-diagnosis, the faulty circuit may have been involved in execution of an instruction code before the detection. In this case, even when a self-diagnosis error is detected, by detecting whether an NVM error has occurred, it is possible to detect an NVM error occurring when a faulty circuit has been involved in execution of an instruction code.

Fourth Embodiment

An MCU 400 according to a fourth embodiment will be described. The MCU 400 is a modification of the MCU 200. The configuration of the MCU 400 is the same as the MCU 200 and description thereof will not be provided. Explanation is made on the operation when a reset which has been executed during power-on of the MCU 400 or failure recovery is canceled in the present embodiment. The reset can be executed from an external device of the MCU 400, for example, and may be executed as a power-on reset during a power-on event.

Figure 13:
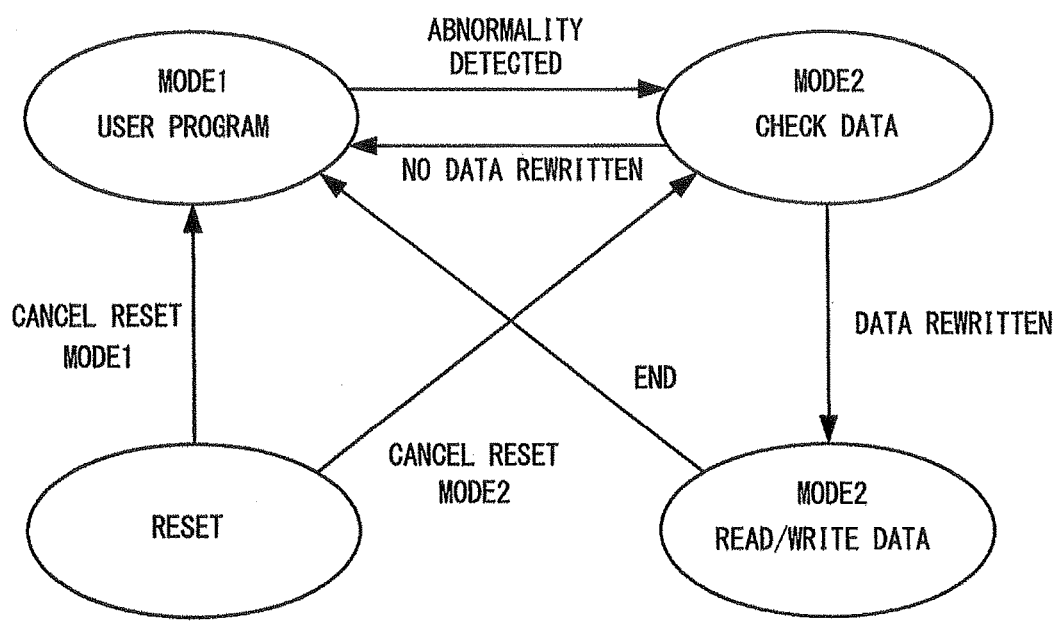
FIG. 13 is a state transition diagram of a microcomputer according to a fourth embodiment.
Figure 14:
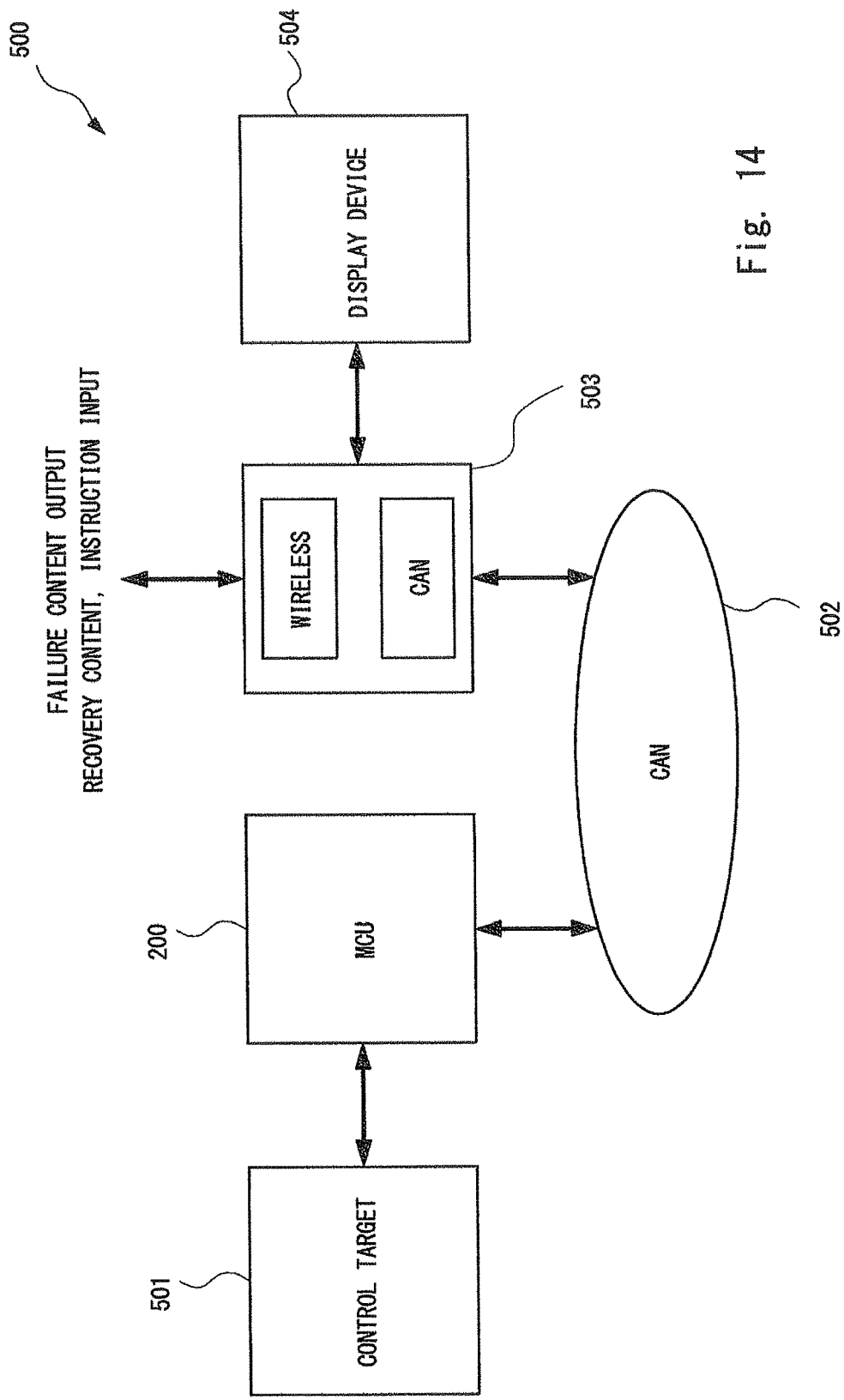
FIG. 14 is a diagram schematically illustrating a configuration of a control system according to a fifth embodiment.

FIG. 13 is a state transition diagram of the MCU 400 according to the fourth embodiment. When the MDC 3 designates an operation in the first operation mode MODE1, the MCU 400 starts operating in the first operation mode MODE1 after the reset is canceled. After that, the operation illustrated in FIG. 9 is executed appropriately.

When the MDC 3 designates an operation in the second operation mode MODE2, the MCU 400 starts operating in the second operation mode MODE2 (that is, the operation starting with step S13 illustrated in FIG. 9) after the reset is canceled.

According to this configuration, even when the second operation mode MODE2 is designated after the reset is canceled and an NVM error has occurred due to another operation before the reset is canceled, it is possible to recover the NVM automatically. Due to this, it is possible to further increase the possibility that the operation of the MCU after reset can be normalized.

Fifth Embodiment

A control system 500 according to a fifth embodiment will be described. The control system 500 is configured as a system in which the MCU described above is integrated. FIG. 1s a block diagram schematically illustrating the configuration of the control system 500 according to the fifth embodiment.

The control system 500 includes an MCU 200, a control target 501, a network (CAN) 502, a communication unit 503, and a display device 504. When the control system 500 is a vehicle control system, the control target 501 is an engine and controls ignition of the engine or the like, for example.

The MCU 200 and the control target (engine) 501 exchange data via the I/O 10. That is, when a data abnormality occurs in the MCU 200, by deactivating the I/O 10, it is possible to stop the engine, for example, to thereby prevent a vehicle from entering a dangerous driving state.

The content to be written to the NVM 4 may be input directly from an external device using communication means (for example, the communication module 8) of the MCU itself. Moreover, the content may also be input using communication means (the communication unit 503) of another device connected via the network 502 such as CAN. When the other device has a wireless communication function (for example, wireless access in vehicle environment (WAVE)) as means for communicating with an external device, by using the wireless communication function, it is possible to eliminate a dedicated recovery input function and to avoid adding a hardware function of the system.

The NVM error detection function of the MCU may be included in the other device and means for inputting the content to be written to the NVM may be shared.

Moreover, when the control system uses the MCU 300, after the content of the self-diagnosis error is output to an external device via communication means and an instruction to perform a process other than the process of writing the content received from an external device to the NVM 4 according to the content may be input.

Further, another device may control the display device 504 via a predetermined video interface or the like. In this case, it is possible to cause the display device 504 to display information based on the content of the self-diagnosis error. Moreover, the display device may be caused to display instruction input information, which is input from an external device in response to the content of the self-diagnosis error. For example, a necessary operation may be presented to a driver to urge the driver to maintain a safe driving state to thereby guide the driver to a safe state. The display device 504 may be controlled by another device connected to the network 502.

As described above, when another device that communicates with an external device of a system is present in the system, notification to an external device, of a self-diagnosis error or the content of a detected failure and communication for inputting a program to be written to an NVM can be performed via communication with an external device outside the system and communication with another device different from a microcomputer. By doing so, it is possible to suppress adding the function of hardware on a system and to suppress the system from becoming complex.

Other Embodiments

The present invention is not limited to the embodiments described above but can be changed appropriately without departing from the spirit thereof. For example, the MCU 300 according to the third embodiment may perform the NVM recovery operation in steps S21 to S24 similarly to the MCU 200 according to the second embodiment.

The MCU 400 according to the fourth embodiment may perform the self-diagnosis in steps S31 and S32 similarly to the MCU 300 according to the third embodiment.

In the control system according to the fifth embodiment, although an example in which the MCU 200 and the MCU 300 are used has been described, the MCU 100, the MCU 400, and an MCU according to the above description can also be employed.

The NVM can be configured as a random accessible memory (NVRAM). In this case, the NVM and the RAM can be shared and the RAM can be eliminated. Moreover, a cache memory or the like may be added to the NVM.

Means for setting the output state of the I/O 10 to an inactive state can be selected appropriately. For example, the I/O 10 can be deactivated by putting the I/O 10 to a high-impedance state. During the deactivation, a predetermined state transition may be created. Deactivation of the I/O 10 may be realized by hardware and may be realized by a combination with execution of a program by the CPU 1.

When the NVM checking unit 4A is configured as a dedicated CPU, it is possible to cope with various changes. Moreover, the necessary function of the NVM checking unit 4A may be realized by dedicated hardware.

Various means may be used for inhibiting writing of data to the second address area 22 of the NVM address area 20.

The detection content of the data error and the detection means can be changed appropriately. A transmission route of a detected error can be changed appropriately. The self-diagnosis unit 12 may be implemented appropriately according to a self-diagnosis target.

The configuration and the address space of the MCU are examples only and are not limited to the above example. Communication means, other functional blocks, and the like may be removed, added, or changed appropriately.

The configuration and the purpose of the control system 500 are examples only and can be changed appropriately.

Although the example of a single-chip microcomputer has been described in the above explanation, the present invention is not limited to this and a program storage memory that is rewritable electrically such as a flash memory may be provided outside a microcomputer. Moreover, the present invention can be applied to other semiconductor integrated circuit devices such as a digital signal processor (DSP) as a main unit, for example. In other words, the NVM error detection and its associated function and operation can be applied to a semiconductor integrated circuit device that stores the program of a data processing device in a rewritable memory.

While the present invention made by the present inventors has been described in detail based on the embodiments, the present invention is not limited to the embodiments described above, and various changes can be made without departing from the spirit thereof.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A microcomputer having a plurality of functional blocks that exchange information with each other, the microcomputer comprising:
    a nonvolatile memory which can rewrite information stored therein and in which checking data used to check data written in the nonvolatile memory has been written in advance;
    a central processing unit that processes information read from the nonvolatile memory or writes information to the nonvolatile memory;
    an abnormality detecting unit that detects an abnormality in exchange of data between the plurality of functional blocks; and
    a nonvolatile memory checking unit that generates the checking data when the data written in the nonvolatile memory is written in the nonvolatile memory and writes the generated checking data in the nonvolatile memory,
    wherein when the abnormality detecting unit has detected an abnormality, the nonvolatile memory checking unit reads the checking data from the nonvolatile memory and compares the read checking data with reference data indicating an expected value of the read checking data, and detects an abnormality in the nonvolatile memory when a result of the comparison shows that the read checking data is not identical to the reference data.

2. The microcomputer according to claim 1, further comprising an input/output unit that implements transmission and reception of data between the microcomputer and an external device which is external to the microcomputer,
    wherein when the abnormality detecting unit has detected an abnormality, the input/output unit stops transmission and reception of data between the microcomputer and the external device.

3. The microcomputer according to claim 2, wherein when an abnormality in the nonvolatile memory has been detected,
    the central processing unit acquires data that is to be written to the nonvolatile memory from the external device, and writes the acquired data to the nonvolatile memory to recover the data of the nonvolatile memory.

4. The microcomputer according to claim 3, wherein when the abnormality detecting unit has detected an abnormality,
    the microcomputer transitions from a first operation mode corresponding to an operation mode before an abnormality is detected by the abnormality detecting unit to a second operation mode corresponding to an operation mode before and after an abnormality is detected by the abnormality detecting unit, and transitions from the second operation mode to the first operation mode after recovery of the data of the nonvolatile memory is completed.

5. The microcomputer according to claim 4, further comprising an operation mode control unit that designates an operation mode of the microcomputer,
    wherein when the plurality of functional blocks are reset and the reset is canceled, the microcomputer performs an operation corresponding to the first operation mode or the second operation mode designated by the operation mode control unit.

6. The microcomputer according to claim 1, wherein when the nonvolatile memory checking unit has detected an abnormality, both or at least one of another functional block and an external device which is external to the microcomputer are notified of the detected abnormality.

7. The microcomputer according to claim 1, wherein when the abnormality detecting unit has detected an abnormality, both or at least one of another functional block and an external device which is external to the microcomputer are notified of the detected abnormality.

8. The microcomputer according to claim 1, further comprising a self-diagnosis unit that detects an abnormality in the functions of the plurality of functional blocks, wherein when the self-diagnosis unit has detected an abnormality in any of the functions of the plurality of functional blocks, the self-diagnosis unit notifies both or at least one of another functional block and an external device which is external to the microcomputer of the detected abnormality.

9. The microcomputer according to claim 8, wherein when the self-diagnosis unit has detected an abnormality, the nonvolatile memory checking unit detects an abnormality in the nonvolatile memory.

10. The microcomputer according to claim 1, wherein the abnormality detecting unit detects an improper instruction abnormality in the central processing unit when an instruction output from the central processing unit is not an instruction defined in the central processing unit.

11. The microcomputer according to claim 1, wherein the abnormality detecting unit detects an access abnormality in the central processing unit when the central processing unit accesses an area, in which an access is inhibited, of the nonvolatile memory.

12. A microcomputer system comprising:
a control target device; and
a microcomputer that has a plurality of functional blocks that exchange information with each other and controls the operation of the control target device, the microcomputer comprising:
  a nonvolatile memory which can rewrite information stored therein and in which checking data used to check data written in the nonvolatile memory has been written in advance;
  a central processing unit that processes information read from the nonvolatile memory or writes information to the nonvolatile memory;
  an abnormality detecting unit that detects an abnormality in exchange of data between the plurality of functional blocks; and
  a nonvolatile memory checking unit that generates the checking data when the data written in the nonvolatile memory is written in the nonvolatile memory and writes the generated checking data in the nonvolatile memory,
wherein when the abnormality detecting unit has detected an abnormality, the nonvolatile memory checking unit reads the checking data from the nonvolatile memory and compares the read checking data with reference data indicating an expected value of the read checking data, and detects an abnormality in the nonvolatile memory when a result of the comparison shows that the read checking data is not identical to the reference data.

13. The microcomputer according to claim 2, wherein the external device comprises a control target device, an operation of the control target device being controlled by the microcontroller.

14. The microcomputer according to claim 13, wherein the control target device comprises an engine.

15. The microcomputer according to claim 1, wherein during a write operation, the nonvolatile memory checking unit generates the first data according to a writing content, and writes the generated first data to a predetermined area of the nonvolatile memory.

16. The microcomputer according to claim 1, wherein the first data comprises one of a checksum and a cyclic code.

17. The microcomputer according to claim 1, wherein the nonvolatile memory checking unit is included in the nonvolatile memory.

18. The microcomputer according to claim 1, wherein the second data comprises reference data which has been stored in advance.

19. The microcomputer according to claim 2, wherein the plurality of functional blocks comprises the nonvolatile memory, the central processing unit, and the input/output unit, and wherein the plurality of functional blocks are connected via an internal bus, and exchange data via the internal bus.

20. A microcomputer comprising:
a nonvolatile memory which can rewrite information stored therein and in which checking data used to check data written in the nonvolatile memory has been written in advance;
a central processing unit that processes information read from the nonvolatile memory or writes information to the nonvolatile memory;
an abnormality detecting unit that detects an abnormality in exchange of data between a plurality of functional blocks;
a nonvolatile memory checking unit that generates the checking data when the data written in the nonvolatile memory is written in the nonvolatile memory and writes the generated checking data in the nonvolatile memory, and when the abnormality detecting unit has detected an abnormality, the nonvolatile memory checking unit reads the checking data from the nonvolatile memory and compares the read checking data with reference data indicating an expected value of the read checking data, and detects an abnormality in the nonvolatile memory when a result of the comparison shows that the read checking data is not identical to the reference data;
an input/output unit that implements transmission and reception of data between the microcomputer and an external device which is external to the microcomputer, and when the abnormality detecting unit has detected an abnormality:
  the input/output unit stops transmission and reception of data between the microcomputer and the external device; and
  the central processing unit acquires data that is to be written to the nonvolatile memory from the external device, and writes the acquired data to the nonvolatile memory to recover the data of the nonvolatile memory; and
an operation mode control unit that designates an operation mode of the microcomputer, and when the plurality of functional blocks are reset and the reset is canceled, the microcomputer performs an operation corresponding to a first operation mode or a second operation mode designated by the operation mode control unit,
wherein the plurality of functional blocks include the nonvolatile memory, the central processing unit, the input/output unit, and the operation mode control unit, and are connected via an internal bus, and exchange data via the internal bus.

* * * * *